United States Patent
Bohling et al.

(10) Patent No.: US 10,519,281 B2
(45) Date of Patent: Dec. 31, 2019

(54) AQUEOUS DISPERSION OF FLUOROALKYLATED POLYMER PARTICLES WITH ACORN MORPHOLOGY

(71) Applicant: Rohm and Haas Company, Collegeville, PA (US)

(72) Inventors: James C. Bohling, Lansdale, PA (US); Arnold S. Brownell, Lansdale, PA (US); Andrew Swartz, Fleetwood, PA (US)

(73) Assignee: Rohm and Haas Company, Philadelphia, PA (US)

( * ) Notice: Subject to any disclaimer, the term of this patent is extended or adjusted under 35 U.S.C. 154(b) by 240 days.

(21) Appl. No.: 15/830,676

(22) Filed: Dec. 4, 2017

(65) Prior Publication Data

US 2018/0346660 A1    Dec. 6, 2018

Related U.S. Application Data

(60) Provisional application No. 62/432,057, filed on Dec. 9, 2016.

(51) Int. Cl.
| | |
|---|---|
| *C08F 30/02* | (2006.01) |
| *C08F 230/02* | (2006.01) |
| *C08J 3/05* | (2006.01) |
| *C08F 130/02* | (2006.01) |
| *C08L 33/14* | (2006.01) |
| C08F 214/28 | (2006.01) |
| C08F 114/28 | (2006.01) |
| C08F 14/18 | (2006.01) |
| C08F 214/18 | (2006.01) |
| C08F 114/18 | (2006.01) |
| C08F 14/28 | (2006.01) |
| C08L 25/18 | (2006.01) |

(52) U.S. Cl.
CPC .......... *C08J 3/05* (2013.01); *C08F 30/02* (2013.01); *C08F 130/02* (2013.01); *C08F 230/02* (2013.01); *C08L 33/14* (2013.01); C08F 14/18 (2013.01); C08F 14/28 (2013.01); C08F 114/18 (2013.01); C08F 114/28 (2013.01); C08F 214/18 (2013.01); C08F 214/186 (2013.01); C08F 214/28 (2013.01); C08F 214/285 (2013.01); C08F 2800/20 (2013.01); C08J 2333/16 (2013.01); C08L 25/18 (2013.01); C08L 2207/53 (2013.01)

(58) Field of Classification Search
CPC . C08J 3/05; C08F 30/02; C08F 130/02; C08F 230/02; C08F 214/18; C08F 214/186; C08F 214/28; C08F 214/285; C08F 114/18; C08F 114/28; C08F 14/18; C08F 14/28

See application file for complete search history.

(56) References Cited

U.S. PATENT DOCUMENTS

| | | | |
|---|---|---|---|
| 7,179,531 | B2 | 2/2007 | Brown et al. |
| 9,303,161 | B2 | 4/2016 | Bohling et al. |
| 9,475,932 | B2 | 10/2016 | Brownell et al. |
| 2016/0040004 | A1 | 2/2016 | Brownell et al. |
| 2016/0268565 | A1* | 9/2016 | Sasaki ............... H01M 4/622 |

FOREIGN PATENT DOCUMENTS

| | | |
|---|---|---|
| WO | WO-2015064411 A1 * | 5/2015 |
| WO | 2016176386 | 11/2016 |

OTHER PUBLICATIONS

Andreas Walther et al: Synthesis, Self-Assembly, Physical Properties, and Applications, Chemical Reviews, vol. 113, No. 7, Apr. 4, 2013 (Apr. 4, 2013), pp. 5194-5261.

Anuradha Misra et al: Polymeric Nano-Colloids: Synthesis and Self-Assembled Films, Macromolecular Rapid Communications, Jan. 8, 2010 (Jan. 8, 2010).

Jaewon Yoon et al: polymer particles with distinct compartments, Journal of Materials Chemistry, vol. 21, No. 24, Apr. 28, 2011 (Apr. 28, 2011), p. 8502.

Search report from corresponding European 17204241.8 application, dated May 8, 2018.

\* cited by examiner

*Primary Examiner* — Ling Siu Choi
*Assistant Examiner* — David L Miller
(74) *Attorney, Agent, or Firm* — Reid S. Willis

(57) ABSTRACT

The present invention provides a composition comprising 1) an aqueous dispersion of polymer particles having a core-shell morphology wherein the core protuberates from the shell; wherein the core comprises from 5 to 90 weight percent structural units of a fluoroalkylated monomer, and 2) less than 0.09 weight percent structural units of a phosphorus acid monomer; and wherein the shell comprises from 0.1 to 5 weight percent of itaconic acid or a phosphorus acid monomer, based on the weight of the shell. The present invention addresses a need in the art by providing a way of selectively concentrating fluoroalkyl functionality into polymer particles with acorn morphology, thereby providing an improvement in dirt pick-up resistance of the subsequent coating.

9 Claims, No Drawings

AQUEOUS DISPERSION OF FLUOROALKYLATED POLYMER PARTICLES WITH ACORN MORPHOLOGY

BACKGROUND OF THE INVENTION

The present invention relates to an aqueous dispersion of fluoroalkylated polymer particles with acorn morphology.

Aqueous dispersions of polymer particles functionalized with fluoroalkyl groups (fluoroalkylated latexes) are used in coatings formulations due to their differentiated performance relative to traditional non-fluorinated hydrocarbon-based polymers. The inclusion of fluorinated functionality is often desirable in coatings applications where soil resistance, stain resistance, durability, and/or weatherability are sought after performance properties. One of the primary drawbacks to using fluoroalkylated latexes is the significant cost premium relative to their hydrocarbon counterparts. Accordingly, it would be an advantage in the field of coatings to find a polymer capable of delivering improved stain resistance more efficiently.

SUMMARY OF THE INVENTION

The present invention addresses a need in the art by providing a composition comprising 1) an aqueous dispersion of polymer particles having a particle size as measured by dynamic light scattering in the range of from 40 nm to 300 nm, wherein the polymer particles have a core-shell morphology wherein the core protuberates from the shell; wherein the core comprises from 5 to 90 weight percent structural units of a fluoroalkylated monomer, and 2) less than 0.09 weight percent structural units of a phosphorus acid monomer, based on the weight of the core; and wherein the shell comprises from 0.1 to 5 weight percent of itaconic acid or a phosphorus acid monomer, based on the weight of the shell; wherein the weight-to-weight ratio of the shell to the core is in the range of from 3:1 to 50:1. The present invention addresses a need in the art by providing a way of selectively concentrating fluoroalkyl functionality into polymer particles with acorn morphology.

DETAILED DESCRIPTION OF THE INVENTION

The present invention is a composition comprising 1) an aqueous dispersion of polymer particles having a particle size as measured by dynamic light scattering in the range of from 40 nm to 300 nm, wherein the polymer particles have a core-shell morphology wherein the core protuberates from the shell; wherein the core comprises from 5 to 90 weight percent structural units of a fluoroalkylated monomer, and 2) less than 0.09 weight percent structural units of a phosphorus acid monomer, based on the weight of the core; and wherein the shell comprises from 0.1 to 5 weight percent of itaconic acid or a phosphorus acid monomer, based on the weight of the shell; wherein the weight-to-weight ratio of the shell to the core is in the range of from 3:1 to 50:1.

The polymer particles are characterized by having acorn morphology whereby the core protuberates from the shell.

The core portion of the polymer particles comprises structural units of a fluoroalkylated monomer. Preferably, the core comprises from 20 more preferably from 25 weight percent, to 70, more preferably to 50 weight percent structural units of the fluoroalkylated monomer, based on the weight of the core.

The fluoroalkylated monomer is ethylenically unsaturated and preferably comprises at least one perfluoromethyl group and a methylene group. Preferred classes of fluoroalkyl monomers are illustrated by the following formulas:

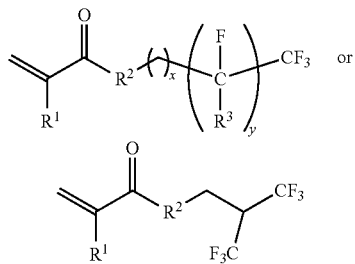

where $R^1$ is H or methyl; $R^2$ is O, S, or $NR^4$; $R^3$ is H or F; and x is 1 or 2; and y is from 0, preferably from 1, to 10, preferably to 5, and more preferably 2, where $R^4$ is H or methyl. $R^2$ is preferably O; $R^3$ is preferably F.

The polymer particles are preferably acrylic, styrene-acrylic, or vinyl ester-acrylic polymers (including vinyl acetate-acrylic and vinyl versatate-acrylic polymers).

The protuberating core portion of the polymer particles preferably comprises from 10 to 90 weight percent structural units of a styrene or acrylate monomer or combinations thereof. As used herein, acrylate monomer refers to acrylates such as ethyl acrylate, butyl acrylate, and 2-ethyhexyl acrylate, as well as methacrylates such as methyl methacrylate and butyl methacrylate. As used herein, the term "structural unit" of the named monomer, refers to the remnant of the monomer after polymerization. For example, a structural unit of a preferred class of fluoroalkylated monomers is as illustrated:

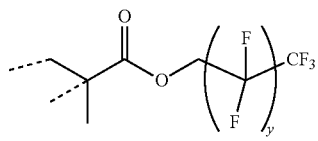

where the dotted lines represent the points of attachment of the structural unit to the polymer backbone and y is preferably 0, 1, or 2.

The core portion of the polymer particles preferably comprises less than 0.05, more preferably less than 0.01, and most preferably 0 weight percent of a phosphorus acid monomer. The core portion preferably comprises structural units of a carboxylic acid monomer and/or a sulfur acid monomer and/or salts thereof at a combined concentration in the range of from 0.1 to 10 weight percent, based on the weight of the core. When present, the concentration of structural units of the carboxylic acid monomer or the salt thereof is preferably in the range of from 0.1, more preferably from 0.5 weight percent, to 5, more preferably to 3 weight percent, based on the weight of the core; similarly, when present, the concentration of structural units of the sulfur acid monomer or the salt thereof is preferably in the range of from 0.1, more preferably from 0.5 weight percent, to 5, more preferably to 3 weight percent, based on the weight of the core.

Suitable carboxylic acid monomers include acrylic acid, methacrylic acid, itaconic acid, and salts thereof; suitable sulfur acids include sulfoethyl methacrylate, sulfopropyl methacrylate, styrene sulfonic acid, vinyl sulfonic acid, and 2-(meth)acrylamido-2-methyl propanesulfonic acid, as well as salts thereof. Preferably, the core comprises structural units of a carboxylic acid monomer or a salt thereof and structural units of a sulfur acid monomer or a salt thereof; more preferably the core comprises methacrylic acid or a salt thereof and a salt of styrene sulfonic acid, more particularly sodium 4-vinylbenzenesulfonate, at a combined concentration in the range of from 1 to 10 weight percent, based on the weight of the core.

The core further preferably comprises from 0.1, more preferably from 0.3, and most preferably from 0.5 weight percent, to preferably 5, and more preferably to 3 weight percent structural units of a multiethylenically unsaturated monomer, based on the weight of the core. An example of a preferred multiethylenically unsaturated monomer is a diethylenically unsaturated monomer such as allyl methacrylate or divinyl benzene.

The core preferably has a volume average diameter in the range of from 30, more preferably from 40 nm, to 90, more preferably to 80 nm (as measured by a BI-90 Dynamic Light Scattering Particle Analyzer) and preferably a $T_g$ as calculated by the Fox equation in the range of from $-30°$ C., more preferably from $-20°$ C., to preferably 60° C., more preferably to 40° C., and most preferably to 20° C.

The shell of the polymer particles preferably further comprises 1) methyl methacrylate or styrene or a combination thereof, preferably at a total concentration in the range of from 20, more preferably from 30, and most preferably from 40 weight percent, to 70, more preferably to 60, and most preferably to 55 weight percent, based on the weight of the shell; and 2) structural units of butyl acrylate, 2-ethylhexyl acrylate, or ethyl acrylate or a combination thereof, more preferably structural units of butyl acrylate, preferably at a total concentration in the range of from 20, more preferably from 30, and most preferably from 40 weight percent; to preferably 70, more preferably to 65, and most preferably to 60 weight percent based on the weight of the shell.

The shell comprises from 0.1, preferably from 0.2, more preferably from 0.5 weight percent, to 5, and preferably to 3 weight percent structural units of itaconic acid or a phosphorus acid monomer, preferably a phosphorus acid monomer, based on the weight of the shell. Examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkylmethacrylates and hydroxyalkylacrylates, including phosphoethyl methacrylate and phosphopropyl methacrylates, with phosphoethyl methacrylate being especially preferred. "Phosphoethyl methacrylate" (PEM) is used herein to refer to the following structure:

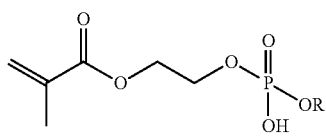

where R is H or

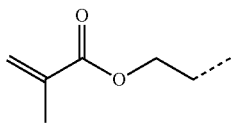

wherein the dotted line represents the point of attachment to the oxygen atom.

The shell also preferably comprises from 0.1, more preferably from 0.5, and most preferably from 1 weight percent, to 10, more preferably to 8 weight percent structural units of an acid monomer or salts thereof selected from sulfur acid monomers, carboxylic acid monomers, and salts of sulfur acid monomers and carboxylic acid monomers, based on the weight of the shell. More preferably the shell comprises structural units of methacrylic acid or a salt thereof and a 4-vinylbenzenesulfonate at a combined concentration in the range of from 0.5 to 8 weight percent, based on the weight of the shell.

The weight-to-weight ratio of the shell to the core is in the range of from 3:1, preferably from 5:1, to 50:1, preferably to 35:1. The polymer particles have a particle size as measured by dynamic light scattering in the range of from 40 nm, preferably from 50 nm, and more preferably from 70 nm, to 300 nm, preferably to 200 nm, and more preferably to 180 nm.

In a preferred method of making the aqueous dispersions of polymer particles, a first monomer emulsion is advantageously prepared by contacting water, butyl acrylate, methyl methacrylate or styrene, allyl methacrylate, 2,2,2,-trifluoroethyl methacrylate, sodium 4-vinylbenzenesulfonate, and methacrylic acid under emulsion polymerization conditions to form a precursor to the protuberating core. The precursor to the protuberating core (the preform) is isolated and characterized. Then, water, the precursor, and a monomer emulsion of butyl acrylate, methyl methacrylate, methacrylic acid, sodium 4-vinylbenzenesulfonate and optionally a phosphorus acid monomer are reacted in a separate and distinct step from the polymerization of the precursor under emulsion polymerization conditions to form the stable aqueous dispersion of polymer particles with acorn morphology.

In another preferred method of making the aqueous dispersion, the polymer particles are made via an two-stage approach where a first monomer emulsion is advantageously prepared by contacting water, butyl acrylate, methyl methacrylate or styrene, allyl methacrylate, 2,2,2,-trifluoroethyl methacrylate, sodium 4-vinylbenzenesulfonate, and methacrylic acid under emulsion polymerization conditions to form a dispersion of polymer particles. In the same reactor, the dispersion of polymer particles is then reacted with a second monomer emulsion of butyl acrylate, methyl methacrylate, methacrylic acid, sodium 4-vinylbenzenesulfonate and optionally a phosphorus acid monomer under emulsion polymerization conditions to form the stable aqueous dispersion of polymer particles with acorn morphology.

The composition may include other ingredients selected from the group consisting of dispersants, pigments, defoamers, surfactants, solvents, additional binders, extenders, coalescents, biocides, opaque polymers, and colorants. It has been discovered that coatings from paints formulated using acorn type latex particles having fluorinated alkyl functionality in the core of the acorn shows marked improvement in block resistance as compared with acorn latexes that are not so functionalized.

EXAMPLES

Example 1—Aqueous Dispersion of Acorn Polymer Particles with Fluoroalkylated Core A. Core (Preform) Synthesis A first monomer emulsion was prepared by mixing deionized water (200 g), Disponil FES 993 surfactant (64 g, 30% active), butyl acrylate (203.2 g), styrene (203.2 g), 2,2,2,-trifluoroethyl methacrylate (192 g), allyl methacrylate (9.6 g), sodium 4-vinylbenzenesulfonate (17.78 g, 90% active), and methacrylic acid (16 g).

To a 5-L, four necked round bottom flask equipped with a paddle stirrer, a thermometer, nitrogen inlet, and a reflux condenser was added deionized water (600 g) and Disponil FES 32 surfactant (21.3 g, 30% active). The contents of the flask were heated to 85° C. under $N_2$ and stirring was initiated. A portion of the first monomer emulsion (70 g) was then added, quickly followed by a solution of ammonium persulfate (2.56 g) dissolved in deionized water (30 g) followed by a rinse of deionized water (5 g). After stirring for 10 min, the remainder of the first monomer emulsion, followed by a rinse (25 g), and an initiator solution of ammonium persulfate (0.64 g) and ammonium hydroxide (1 g, 29% active) dissolved in deionized water (24 g) were added linearly and separately over 40 mins and 50 mins, respectively. After the monomer emulsion feed was complete, the contents of the flask were held at 85° C. for 10 min, after which time the co-feed was complete; and the contents of the flask were then held at 85° C. for an additional 10 min.

The contents of the flask were cooled to 70° C. and a catalyst/activator pair was added to the flask to reduce residual monomer. The polymer was then neutralized to pH 4.5 with a dilute ammonium hydroxide solution. The measured particle size using a Brookhaven BI 90 Plus particle analyzer was 59 nm and the solids were 40.2%.

B. Acorn Core-Shell Synthesis

A second monomer emulsion was prepared using deionized water (400 g), sodium dodecylbenzene sulfonate (55.4 g, 23% active), Disponil FES 993 surfactant (42.5 g, 30% active), butyl acrylate (749.7 g), methyl methacrylate (759.9 g), methacrylic acid (10.2 g), and sodium 4-vinylbenzenesulfonate (11.33 g, 90% active).

To a 5-L, four necked round bottom flask equipped with a paddle stirrer, a thermometer, $N_2$ inlet, and a reflux condenser was added deionized water (975 g). The contents of the flask were heated to 84° C. under $N_2$ and stirring was initiated.

A portion of the preform from Step A was then added (425 g, 10% of total monomer based on the finished polymer), followed by a solution of ammonium persulfate (5.1 g) dissolved in deionized water (20 g), and a rinse of deionized water (5 g). After stirring for 5 min, the second monomer emulsion and a solution containing ammonium persulfate (1.7 g) and ammonium hydroxide (2 g, 29% active) dissolved in deionized water (60 g), were each added linearly and separately to the flask over a total period of 80 min. PEM (25.5 g, 60% active) was added to the second monomer emulsion 30 min into the feed of the second monomer emulsion, followed by a rinse of deionized water (25 g).

The contents of the flask were maintained at a temperature of 84° C. during the addition of the second monomer emulsion. When all additions were complete, the vessel containing the second monomer emulsion was rinsed with deionized water (25 g), which was then added to the flask.

The contents of the flask were cooled to 65° C. and a catalyst/activator pair was added to the flask to reduce residual monomer. The polymer was then neutralized to pH=8.8 with a dilute ammonium hydroxide solution. The measured particle size using a Brookhaven BI 90 Plus particle analyzer was 129 nm and the solids were 46.5%.

Comparative Example 1—Aqueous Dispersion of Acorn Polymer Particles with PEM-Functionalized Core A. Core (Preform) Synthesis A first monomer emulsion was prepared by mixing deionized water (200 g), Disponil FES 993 surfactant (43 g, 30% active), butyl acrylate (371.2 g), methyl methacrylate (195.2 g), allyl methacrylate (9.6 g), phosphoethyl methacrylate (51.2 g, 60% active), and methacrylic acid (12.8 g).

To a 5-L, four necked round bottom flask equipped with a paddle stirrer, a thermometer, nitrogen inlet, and a reflux condenser was added deionized water (600 g) and Disponil FES 32 surfactant (43 g, 30% active). The contents of the flask were heated to 85° C. under $N_2$ and stirring was initiated. A portion of the first monomer emulsion (70 g) was then added, quickly followed by a solution of sodium persulfate (2.56 g) dissolved in deionized water (30 g) followed by a rinse of deionized water (5 g). After stirring for 10 min, the remainder of the first monomer emulsion, followed by a rinse (25 g), and an initiator solution of sodium persulfate (0.64 g) dissolved in deionized water (50 g) were added linearly and separately over 40 mins and 50 mins, respectively. After the monomer emulsion feed was complete, the contents of the flask were held at 85° C. for 10 min, after which time the co-feed was complete; and the contents of the flask were then held at 85° C. for an additional 10 min. The contents of the flask were cooled to room temperature and neutralized to pH 3 with a dilute solution of ammonium hydroxide. The measured particle size using a Brookhaven BI 90 Plus particle analyzer was 60-75 nm and the solids were 40%.

B. Acorn Core-Shell Synthesis

A second monomer emulsion was prepared using deionized water (400 g), sodium dodecylbenzene sulfonate (55.4 g, 23% active), Disponil FES 993 surfactant (42.5 g, 30% active), butyl acrylate (749.7 g), methyl methacrylate (759.9 g), methacrylic acid (10.2 g), and sodium 4-vinylbenzenesulfonate (11.33 g, 90% active).

To a 5-L, four necked round bottom flask equipped with a paddle stirrer, a thermometer, $N_2$ inlet, and a reflux condenser was added deionized water (975 g). The contents of the flask were heated to 84° C. under $N_2$ and stirring was initiated. A portion of the preform from Step A was then added (425 g, 10% of total monomer based on the finished polymer), followed by a solution of ammonium persulfate (5.1 g) dissolved in 20 g deionized water, and a rinse of 5 g of deionized water. After stirring for 5 min, the second monomer emulsion and a solution containing ammonium persulfate (1.7 g) and ammonium hydroxide (2 g, 29% active) dissolved in deionized water (60 g), were each added linearly and separately to the flask over a total period of 80 min. The contents of the flask were maintained at a temperature of 84° C. during the addition of the second monomer emulsion. When all additions were complete, the vessel containing the second monomer emulsion was rinsed with deionized water (25 g), which was then added to the flask.

The contents of the flask were cooled to 65° C. and a catalyst/activator pair was added to the flask to reduce residual monomer. The polymer was then neutralized to pH 8.8 with a dilute ammonium hydroxide solution. The measured particle size using a Brookhaven BI 90 Plus particle analyzer was 136 nm and the solids were 46.7%.

Comparative Example 2—Acorn with PEM-Functionalized Shell and Core

The polymerization was conducted substantially as described in Comparative Example 1, with the following modification—30 minutes into the feed of the second monomer emulsion, phosphoethyl methacrylate (25.5 g, 60% active) followed by a rinse of deionized water (25 g) was added to the second monomer emulsion.

The measured particle size using a Brookhaven BI 90 Plus particle analyzer was 142 nm and the solids were 46.6%.

Comparative Example 3—Aqueous Dispersion of Acorn Polymer Particles with Fluoroalkylated Core The polymerization was conducted substantially as described in Example 1 except that PEM was not added in Step B. The measured particle size using a Brookhaven BI 90 Plus particle analyzer was 125 nm and the solids were 46.7%.

The paint formulation is shown in Table 1. TAMOL and ACRYSOL are Trademarks of The Dow Chemical Company or Its Affiliates.

TABLE 1

Paint Formulation

| Material Name | Pounds | Gallons |
| --- | --- | --- |
| Gloss Formulation Grind | | |
| Water | 40.0 | 4.8 |
| BYK-022 Defoamer | 1.0 | 0.1 |
| Surfynol CT-111 Grind Aid | 3.3 | 0.4 |
| TAMOL ™ 2011 Dispersant | 8.8 | 1.0 |
| Ti-Pure R-746 TiO$_2$ | 314.2 | 16.2 |
| Grind Sub-total | 367.3 | 22.5 |
| Let-Down | | |
| Latex | 538.9 | 60.7 |
| Water | — | — |
| BYK-024 Defoamer | 5.0 | 0.6 |
| Texanol Coalescent | 27.3 | 3.4 |
| Ammonia (28%) | 0.0 | 0.0 |
| ACRYSOL ™ RM-2020 NPR Rheology Modifier | 26.2 | 3.0 |
| ACRYSOL ™ RM-8W Rheology Modifier | 2.7 | 0.3 |
| Water | 79.0 | 9.5 |
| Totals | 1046.3 | 100.0 |

Dirt Pick Up Resistance

The paints were drawn down using a 7-mil plastic applicator on treated aluminum panels and dried overnight in the CTR (25° C., 50% R.H.). Next, the panels were placed outside facing southward direction at a 45° angle tilt (South 45) for 6 d, after which time initial (pre-exposed) Y-reflectance of paints was measured. Next, the iron oxide dirt slurry was applied using 1-inch (2.5-cm) brush covering half of the panel. The iron oxide dirt slurry was prepared by dispersing 125 g of Mapico 422 iron oxide in 250 g of water in presence of 0.1 g of TAMOL™ 731A Dispersant. The panels with the slurry were dried for 4 h in a hood. The dried slurry was removed under a stream of water with gently rubbing with a clean piece of cheesecloth. The panels were air dried for at least 2 h. Y reflectance values were measured over the slurry treated areas by the following formula:

$$\text{Dirt Pick up Resistance}(\%) = \frac{Y \text{ reflectance (slurry treated area)}}{Y \text{ reflectance (initial pre-exposed)}} \times 100$$

Table 2 shows the dirt pick-up resistance for each paint.

TABLE 2

Dirt Pick-up Resistance Measurements

| Example Latex | Dirt Pick-Up Resistance % (Y-soiled/Y-unsoiled) |
| --- | --- |
| Comparative 1 | 81.62 |
| Comparative 2 | 83.22 |
| Comparative 3 | 81.04 |
| Inventive 1 | 88.57 |

The results show that incorporation of fluoroalkyl groups into the protuberating core portion, and PEM into the shell portion of the acorn substantially improves dirt pick-up resistance over particles with acorn morphology that include PEM in the core (Comparative Example 1) or PEM in the core and the shell (Comparative Example 2) or the fluoroalkyl groups in the core but no PEM in the shell (Comparative Example 3).

The invention claimed is:

1. A composition comprising an aqueous dispersion of polymer particles having a particle size as measured by dynamic light scattering in the range of from 40 nm to 300 nm, wherein the polymer particles have a core-shell morphology wherein the core protuberates from the shell; wherein the core comprises from 5 to 90 weight percent structural units of a fluoroalkylated monomer, and less than 0.09 weight percent structural units of a phosphorus acid monomer, based on the weight of the core; and wherein the shell comprises from 0.1 to 5 weight percent of itaconic acid or a phosphorus acid monomer, based on the weight of the shell; wherein the weight-to-weight ratio of the shell to the core is in the range of from 3:1 to 50:1.

2. The composition of claim 1 wherein the fluoroalkylated monomer is represented by either the following formulas:

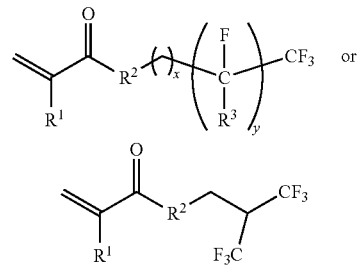

where $R^1$ is H or methyl; $R^2$ is O, S, or $NR^4$; $R^3$ is H or F; and x is 1 or 2; and y is from 0 to 10, where $R^4$ is H or methyl.

3. The composition of claim 2 wherein the fluoroalkylated monomer is represented by either the following formulas:

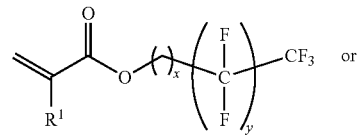

-continued

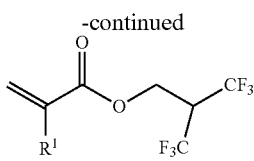

wherein x is 1 and y is 0, 1, or 2.

4. The composition of claim 2 wherein the weight-to-weight ratio of the shell to the core is in the range of from 5:1 to 35:1, and wherein the polymer particles have a particle size as measured by dynamic light scattering in the range of from 70 nm to 200 nm.

5. The composition of claim 4 wherein the shell comprises from 0.5 to 5 weight percent of a phosphorus acid monomer, based on the weight of the shell, and wherein the phosphorus acid monomer is phosphoethyl methacrylate; wherein the shell further comprises from 0.1 to 10 weight percent, based on the weight of the shell, of structural units of an acid monomer selected from the group consisting of sulfur acid monomer, carboxylic acid monomers, and salts of carboxylic acid monomers and sulfur acid monomers.

6. The composition of claim 5 wherein the acid monomer is methacrylic acid or a salt thereof and a 4-vinylbenzenesulfonate at a combined concentration in the range of from 0.5 to 8 weight percent, based on the weight of the shell.

7. The composition of claim 5 wherein the core further comprises from 0.1 to 5 weight percent, based on the weight of the core, of structural units of a sulfur acid monomer or a salt thereof; and from 0.1 to 5 weight percent, based on the weight of the core, of structural a carboxylic acid monomers or a salt thereof; and wherein the core comprises less than 0.05 weight percent structural units of phosphoethyl methacrylate, based on the weight of the core.

8. The composition of claim 5 wherein the core further comprises structural units of methacrylic acid or a salt thereof at a concentration in the range of from 0.1 to 5 weight percent, based on the weight of the core; and structural units of a 4-vinylbenzenesulfonate in the range of from 0.1 to 5 weight percent, based on the weight of the core; and wherein the core comprises less than 0.01 weight percent structural units of phosphoethyl methacrylate, based on the weight of the core.

9. The composition of claim 8 wherein the shell further comprises, based on the weight of the shell, structural units of methyl methacrylate or styrene or a combination thereof at a combined concentration in the range of from 20 to 60 weight percent; and structural units of butyl acrylate or 2-ethylhexyl acrylate or a combination thereof at a combined concentration in the range of from 20 to 60 weight percent.

* * * * *